United States Patent
Oka

(10) Patent No.: US 10,460,088 B2
(45) Date of Patent: Oct. 29, 2019

(54) ELECTRONIC DEVICE AND CONNECTION METHOD

(71) Applicant: Koji Oka, Tokyo (JP)

(72) Inventor: Koji Oka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 230 days.

(21) Appl. No.: 15/442,380

(22) Filed: Feb. 24, 2017

(65) Prior Publication Data

US 2017/0161476 A1 Jun. 8, 2017

Related U.S. Application Data

(63) Continuation of application No. PCT/JP2015/070253, filed on Jul. 15, 2015.

(30) Foreign Application Priority Data

Aug. 25, 2014 (JP) .................... 2014-170365

(51) Int. Cl.
| | |
|---|---|
| *G06F 21/31* | (2013.01) |
| *G06F 21/79* | (2013.01) |
| *H04N 5/225* | (2006.01) |
| *H04N 5/232* | (2006.01) |
| *G06F 3/06* | (2006.01) |
| *H04N 5/765* | (2006.01) |

(Continued)

(52) U.S. Cl.
CPC ............ *G06F 21/31* (2013.01); *G06F 3/0622* (2013.01); *G06F 3/0637* (2013.01); *G06F 3/0679* (2013.01); *G06F 21/79* (2013.01); *H04N 5/225* (2013.01); *H04N 5/232* (2013.01); *H04N 5/765* (2013.01); *H04N 5/77* (2013.01); *H04N 5/772* (2013.01); *H04N 5/907* (2013.01)

(58) Field of Classification Search
CPC ...................................................... G06F 21/31
See application file for complete search history.

(56) References Cited

U.S. PATENT DOCUMENTS

| 5,521,335 A | 5/1996 | Oka |
| 5,745,688 A | 4/1998 | Oka |

(Continued)

FOREIGN PATENT DOCUMENTS

| JP | 2003-216320 | 7/2003 |
| JP | 2004-312240 | 11/2004 |

(Continued)

OTHER PUBLICATIONS

International Search Report dated Sep. 29, 2015 in PCT/JP2015/070253 filed on Jul. 15, 2015(With English Translation).

(Continued)

*Primary Examiner* — Josnel Jeudy
(74) *Attorney, Agent, or Firm* — Oblon, McClelland, Maier & Neustadt, L.L.P.

(57) ABSTRACT

A digital camera adapted to be used with an SD card, which has a security-lock function, includes a password inputting part configured to input a password for releasing the security lock into the SD card. The digital camera releases the security-lock function of the SD card and establishes a communication between the SD card and a personal computer.

11 Claims, 16 Drawing Sheets

(51) Int. Cl.
*H04N 5/907* (2006.01)
*H04N 5/77* (2006.01)

(56) References Cited

U.S. PATENT DOCUMENTS

| | | | |
|---|---|---|---|
| 5,760,345 A | 6/1998 | Oka | |
| 6,268,879 B1* | 7/2001 | Sato | H04M 1/675 348/14.01 |
| 6,729,550 B2* | 5/2004 | Seita | G06K 7/0008 235/375 |
| 9,129,099 B1* | 9/2015 | Paruchuri | G06F 21/30 |
| 2003/0217167 A1* | 11/2003 | Hirose | H04L 63/0846 709/229 |
| 2003/0234877 A1 | 12/2003 | Kanehiro et al. | |
| 2004/0111633 A1* | 6/2004 | Chang | G06F 21/572 726/28 |
| 2004/0124250 A1* | 7/2004 | Kojima | G06K 19/073 235/492 |
| 2004/0125214 A1 | 7/2004 | Oka et al. | |
| 2005/0012828 A1 | 1/2005 | Oka | |
| 2005/0162992 A1* | 7/2005 | Nakashima | G06F 21/34 369/30.29 |
| 2005/0223233 A1 | 10/2005 | Ishidera | |
| 2006/0197976 A1 | 9/2006 | Oka | |
| 2006/0248345 A1 | 11/2006 | Ishidera | |
| 2007/0030512 A1 | 2/2007 | Oka | |
| 2008/0113687 A1* | 5/2008 | Prendergast | H04L 63/0853 455/558 |
| 2008/0215841 A1 | 9/2008 | Bolotin et al. | |
| 2009/0055573 A1 | 2/2009 | Ito | |
| 2009/0254762 A1* | 10/2009 | Priel | G06F 21/79 713/193 |
| 2010/0100628 A1 | 4/2010 | Oka | |
| 2010/0251358 A1* | 9/2010 | Kobayashi | G06F 21/79 726/18 |
| 2010/0313263 A1* | 12/2010 | Uchida | G06F 21/79 726/18 |
| 2011/0145804 A1 | 6/2011 | Oka | |
| 2011/0211690 A1* | 9/2011 | Tu | H04L 9/0863 380/44 |
| 2012/0212648 A1 | 8/2012 | Oka | |
| 2013/0214157 A1 | 8/2013 | Kitano | |
| 2014/0181927 A1* | 6/2014 | Sarkissian | H04L 63/08 726/6 |
| 2015/0020189 A1* | 1/2015 | Soffer | G06F 21/85 726/16 |
| 2015/0278124 A1 | 10/2015 | Bolotin et al. | |
| 2015/0278125 A1 | 10/2015 | Bolotin et al. | |
| 2015/0281205 A1 | 10/2015 | Bolotin et al. | |
| 2015/0341177 A1* | 11/2015 | Ylimartimo | H04L 9/3268 713/169 |

FOREIGN PATENT DOCUMENTS

| | | |
|---|---|---|
| JP | 2005-12418 | 1/2005 |
| JP | 2005-229538 | 8/2005 |
| JP | 2006-253880 | 9/2006 |
| JP | 2009-48543 | 3/2009 |
| JP | 2009-75693 | 4/2009 |
| JP | 2012-73768 | 4/2012 |
| KR | 10-2006-0064227 A | 6/2006 |
| KR | 10-2006-0134037 A | 12/2006 |
| WO | WO 01/15440 A1 | 3/2001 |

OTHER PUBLICATIONS

Office Action dated Jul. 18, 2018 in Korean Patent Application No. 10-2017-7008056 with English translation, 12 pages.
Extended European Search Report dated Aug. 14, 2017 in Patent Application No. 15836019.8.

* cited by examiner

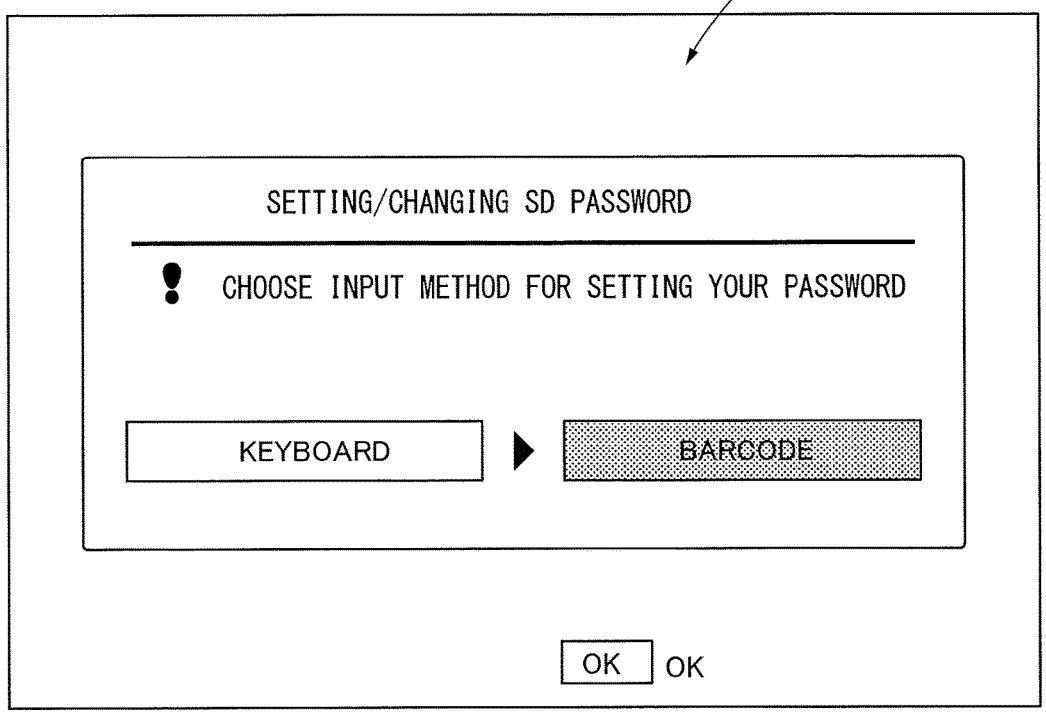
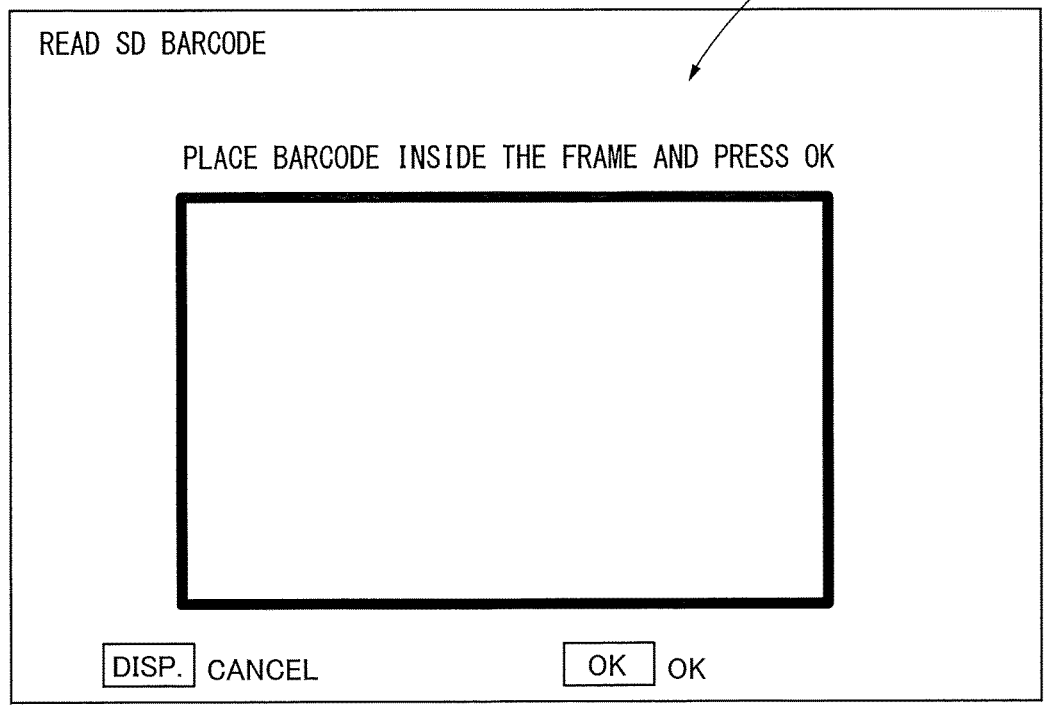

ELECTRONIC DEVICE AND CONNECTION METHOD

CROSS-REFERENCE TO RELATED APPLICATION

The present application is based on and claims priority from Japanese Patent Application No. 2014-170365, filed on Aug. 25, 2014, the disclosure of which is hereby incorporated by reference in its entirety.

TECHNICAL FIELD

This invention relates to an electronic device capable of setting a password for a recording medium and a connection method thereof.

BACKGROUND ART

An electronic device such as a digital camera capable of setting a password for an SD card inserted into the digital camera has conventionally been known (see JP 2004-312240

SUMMARY

Technical Problem

In such a digital camera, it is unable to play images recorded in the SD card for which a security lock has been set even when the SD card is inserted to, for example, a personal computer. That is, it is unable to establish a communication between the SD card (i.e., the recording medium) and the personal computer.

An object of this invention is, therefore, to provide an electronic device and a connection method that are able to release a security lock of a recording medium to establish a communication with an external device.

Solution to Problem

This invention relates to an electronic device capable of being used with a recording medium. Here, the recording medium has a security-lock function in which a security lock is activated by setting a password, and the electronic device includes:

a connecting part configured to connect with an external device, and a password inputting part configured to input the password into the recording medium to temporally release the security-lock function of the recording medium, wherein the electronic device temporally releases the security-lock function of the recording medium by the password input through the password inputting part and establishes a communication between the recording medium and an external device when the connecting part detects a connection with the external device.

Advantageous Effects

Owing to this invention, the electronic device is able to release the security lock of the recording medium and to establish a communication with the external device.

BRIEF DESCRIPTION OF DRAWINGS

FIG. 11A is an explanatory view showing a display screen shown when an item of BARCODE is selected. FIG. 11B is an explanatory view showing an operation screen for inputting a barcode.

DESCRIPTION OF EMBODIMENTS

Hereinafter, examples showing embodiments of an imaging device, which is an electronic device, according to the present invention will be described with reference to the drawings.

First Embodiment

Figure 1:
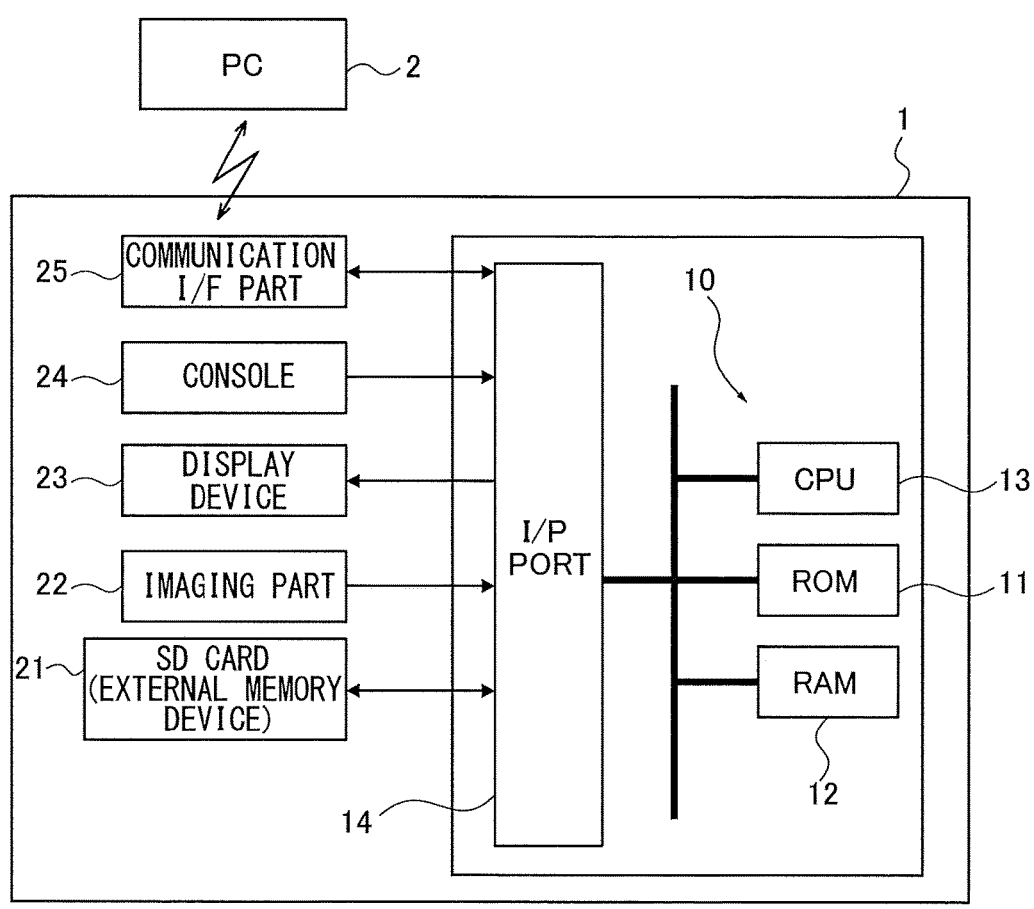
FIG. 1 is a block diagram illustrating a configuration of a digital camera according to the invention.

FIG. 1 is a block diagram illustrating a configuration of a digital camera 1. The digital camera 1 corresponds to the imaging device.

The digital camera 1 includes an imaging part 22, a display device 23, a console 24, a communication I/F part 25, and a control device (CPU part) 10. The imaging part 22 photographs a subject, and the display device 23 displays a subject image (a photographed image) photographed by the imaging part 22 and various information.

The console 24 includes operation buttons to operate various mode settings and various operations.

The display device 23 is equipped with a screen and a touch-panel attached to the screen.

The communication I/F part 25 is configured to communicate with an external device such as a personal computer 2 and to control an interface provided between the communication I/F part 25 and an external shutter-release device.

An external storage, such as an SD card (a recording medium; an external recording device), 21 is removably provided to a device body of the digital camera 1. The SD card 21 records image files corresponding to photographed images photographed by the imaging part 22, and the SD card 21 is capable of being set with a password.

Further, the SD card 21 has a function to determine whether or not the input password coincides with the set password and to release the security lock as a security-lock releasing part when it is determined to be coincides with each other. That is, the SD card 21 has a security-lock function.

The imaging part 22 includes an imaging optical system and an image sensor, such as a CCD, to receive a subject image formed by the imaging optical system.

The control device 10 includes a ROM 11 and a ROM 12 to record programs for taking images and the like, a CPU 13 to integrally control the digital camera 1, and an input-output port 14. The RAM 12 temporally records photographed images and/or records data input to the control device 10.

The screen and the console 24 of the display device 23 are provided on a back face of the device body of the digital camera 1, and a shutter-release button is provided on a top face of the device body. When the shutter-release button is half-depressed, a photometric switch is turned ON and the CPU 13 executes photometric processing in accordance with a photometric-processing program recorded in the ROM 11. When the shutter-release button is fully depressed, the shutter-release button is turned ON and the CPU 13 executes photographic processing in accordance with a photographic-processing program recorded in the ROM 11. The photometric processing and the photographic processing executed in this embodiment are similar to the conventional processing. Hence, the detailed description thereof will be omitted.

[Operation]

Next, the operation performed by the digital camera 1 as described above will be described.

[Password Setting]

First, process for setting a password for an SD card 21 that has not been set with a password will be described.

Figure 2:
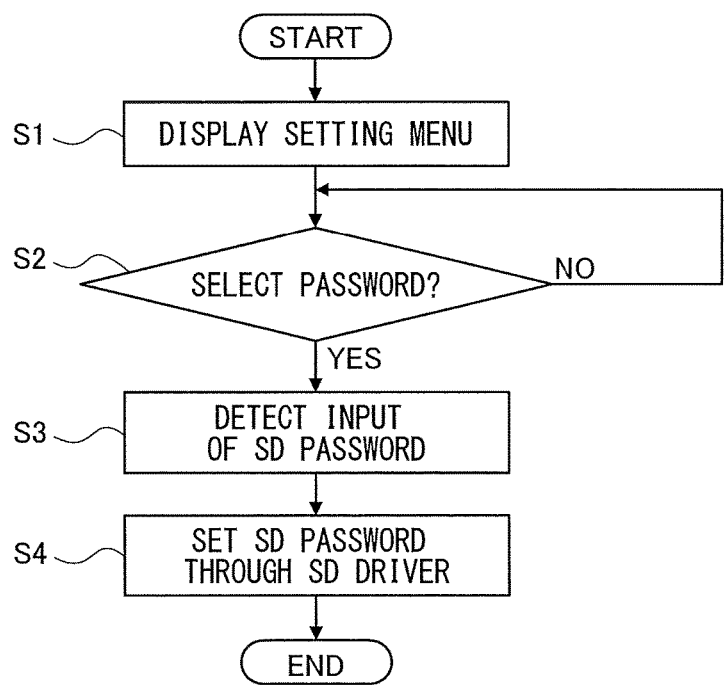
FIG. 2 is a flowchart showing process for setting a password for an SD card which is to be inserted to the digital camera illustrated in FIG. 1.
Figure 8:
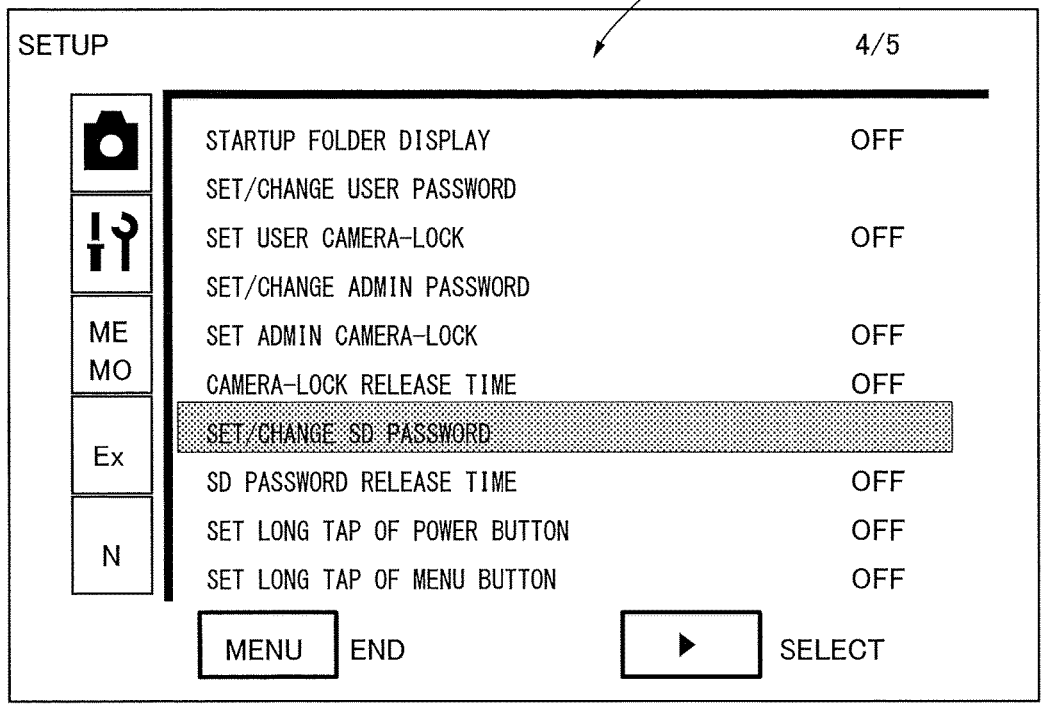
FIG. 8 is an explanatory view showing an example of a display screen showing a setting menu.

The SD card 21 for which the password has not been set is inserted in the digital camera 1, and then the menu button of the console 24 is pressed. The processing shown in the flowchart of FIG. 2 is then commenced. In Step 1, an image G1 for a setting menu shown in FIG. 8 is displayed on the screen of the display device 23 of the digital camera 1.

In Step 2, it is determined whether an item "SD PASSWORD SETTING/CHANGING" is selected or not. The processing in Step 2 is repeated until the item is selected. When the item is selected, the program proceeds to Step 3.

Figure 9:
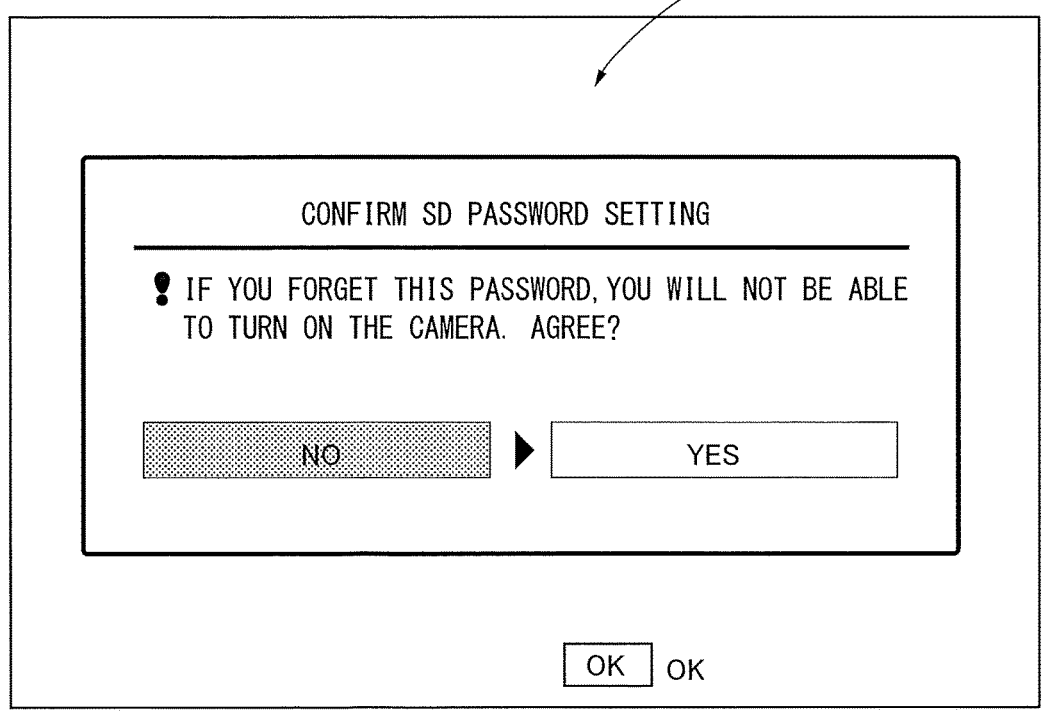
FIG. 9 is an explanatory view showing an example of a display screen used for confirming a password setting.
Figure 10:
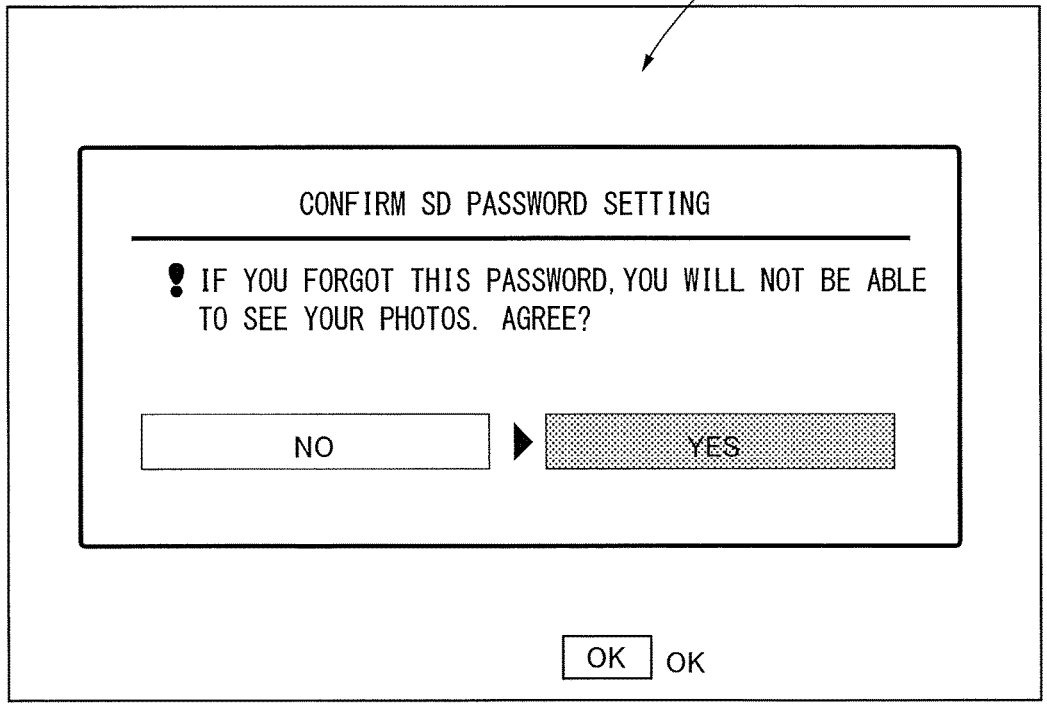
FIG. 10 is an explanatory view showing a display screen shown when selecting "YES" on the screen of FIG. 9.
Figure 11:
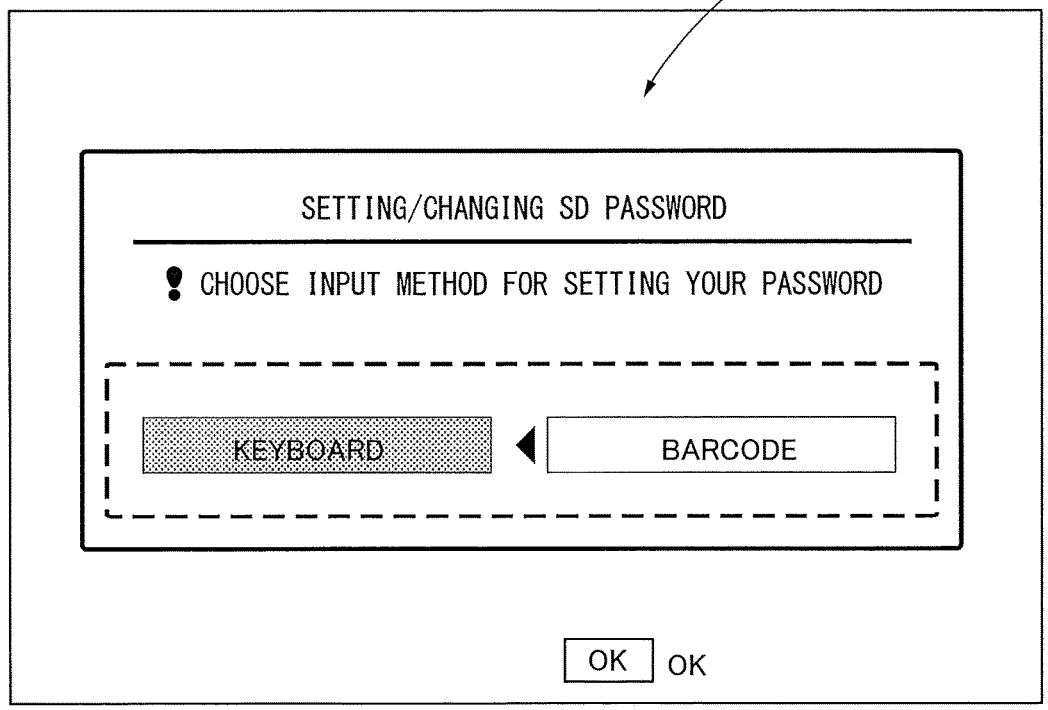
FIG. 11 is an explanatory view showing a display screen showing a method for inputting a password.
Figure 12:
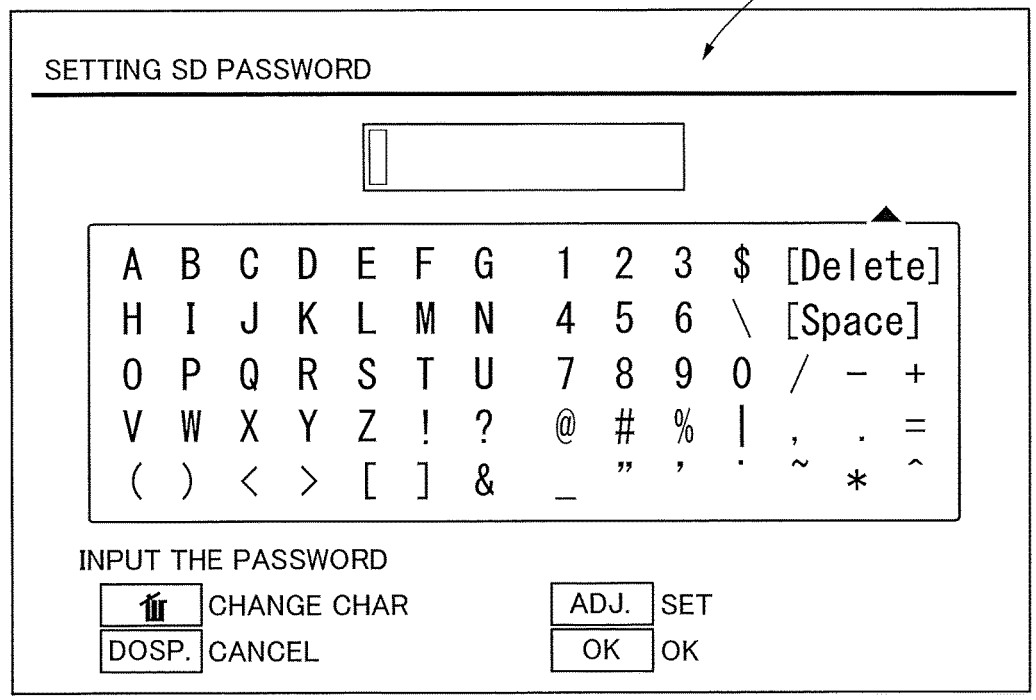
FIG. 12 is an explanatory view showing a display screen for setting a password.

In Step 3, an image G2 shown in FIG. 9 is displayed on the screen of the display device 23. When "YES" is selected on the screen as shown in an image G3 of FIG. 3, an image G4 shown in FIG. 11 is displayed on the screen of the display device 23. When "KEY BOARD" is selected and confirmed, an image G5 shown in FIG. 12 is displayed on the screen of the display device 23. The operator then input the password with the letters on the image G5 by touching the screen. After inputting the password, the program proceeds to Step 4.

In Step 4, a command sequence for setting the password is executed through SD card driver software and the password is written to the SD card 21. Note that the SD card driver software and the command sequence for setting password (i.e., password-setting part) is known in public, and therefore the detailed description thereof will be omitted.

When the password is set for the SD card 21, the process routine of FIG. 2 flowchart is terminated.

After setting the password, it becomes impossible to play or record the image files in the SD card 21 unless inputting the password. In other words, after the password is written to the SD card 21, the security lock for the SD card 21 becomes effective and reading/writing processing in the SD card 21 generates an error without inputting the password.

Next, process for inputting the password using a barcode will be described.

On the image G4 of FIG. 11, which is displayed on the screen of the display device 23, if the item "BARCODE" is selected as shown on an image G4a of FIG. 11A, an image G4b of FIG. 11B is displayed. By operating the display device 23 in accordance with the guidance on the image G4a, the password is written to the SD card 21.

[Connection with an External Device]

Next, a connection with an external device such as the personal computer 2 will be described.

Figure 3:
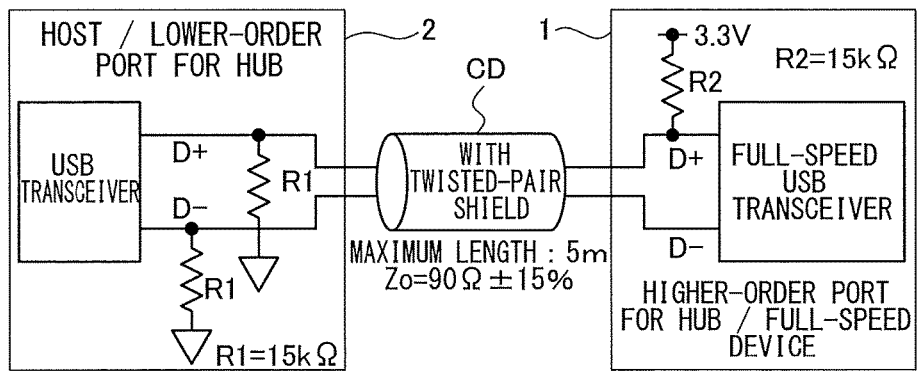
FIG. 3 is a circuit diagram in which the digital camera and a personal computer are connected via a USB cable.
Figure 4:
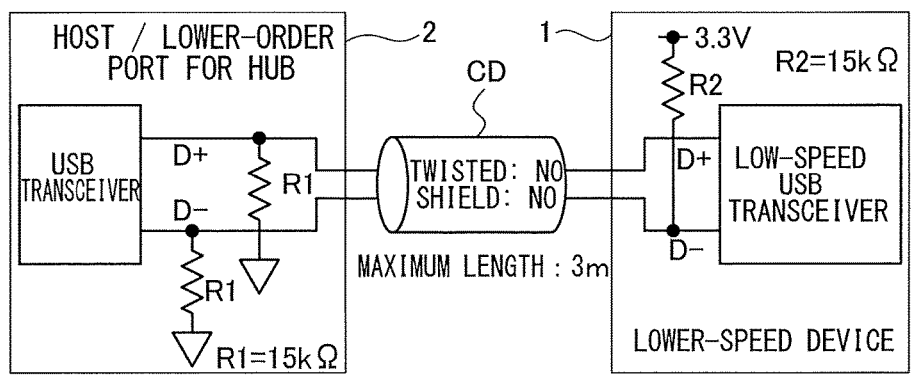
FIG. 4 is another circuit diagram in which the digital camera and the personal computer are connected via a USB cable.

First, the SD card 21 for which the password has been set is inserted to the device body (not illustrated) of the digital camera 1, and the personal computer 2 is connected to the device body via a USB cable CD. With this connection, a voltage of 5V is supplied to the digital camera 1 from the personal computer 2 with a VBUS through the USB cable CD, as shown in FIG. 3 and FIG. 4. Accordingly, the communication I/F part (a connection detecting part) 25 of the digital camera 1 is able to determine whether or not the personal computer 2 is connected regardless of whether the digital camera 1 is a full-speed device or even a low-speed device.

Figure 5:
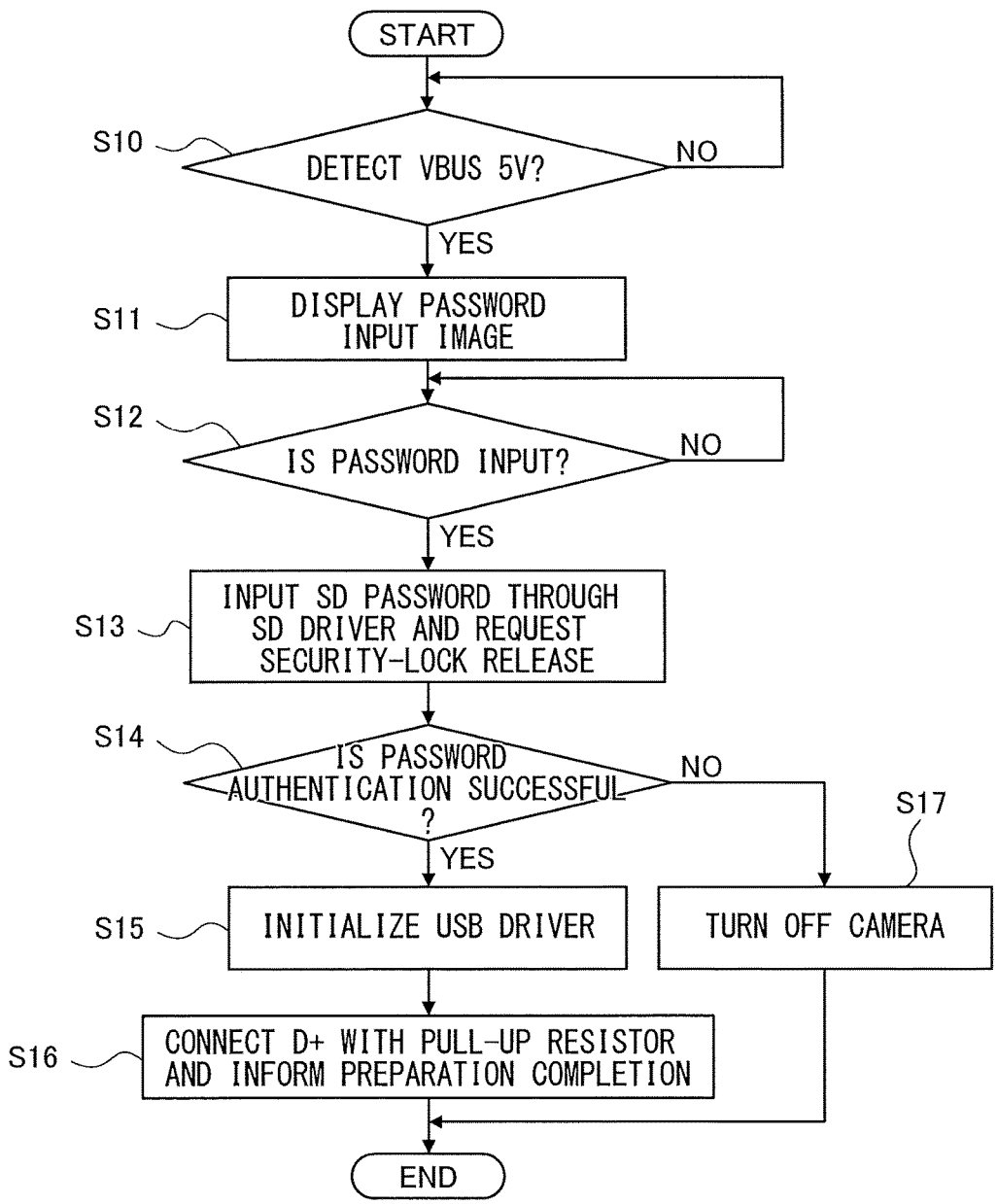
FIG. 5 is a flowchart showing process of the digital camera according to First Embodiment.

The process of FIG. 5 flowchart is commenced when, for example, the digital camera 1 is powered ON. Hereinafter, the process of FIG. 5 flowchart will be described.

In Step 10, it is determined whether or not the communication I/F part 25 of the digital camera 1 detects the voltage of 5V supplied from the personal computer 2 through the VBUS. When the result is negative, the processing in Step 10 is repeated. That is, after the digital camera 1 is powered ON, this processing is repeatedly executed until the connection of the USB cable CD is detected.

As the USB cable CD is connected, the communication I/F part 25 detects the voltage of 5V supplied through the VBUS. Accordingly, the determination result in Step 10 becomes affirmative, and the program proceeds to Step 11.

Figure 13:
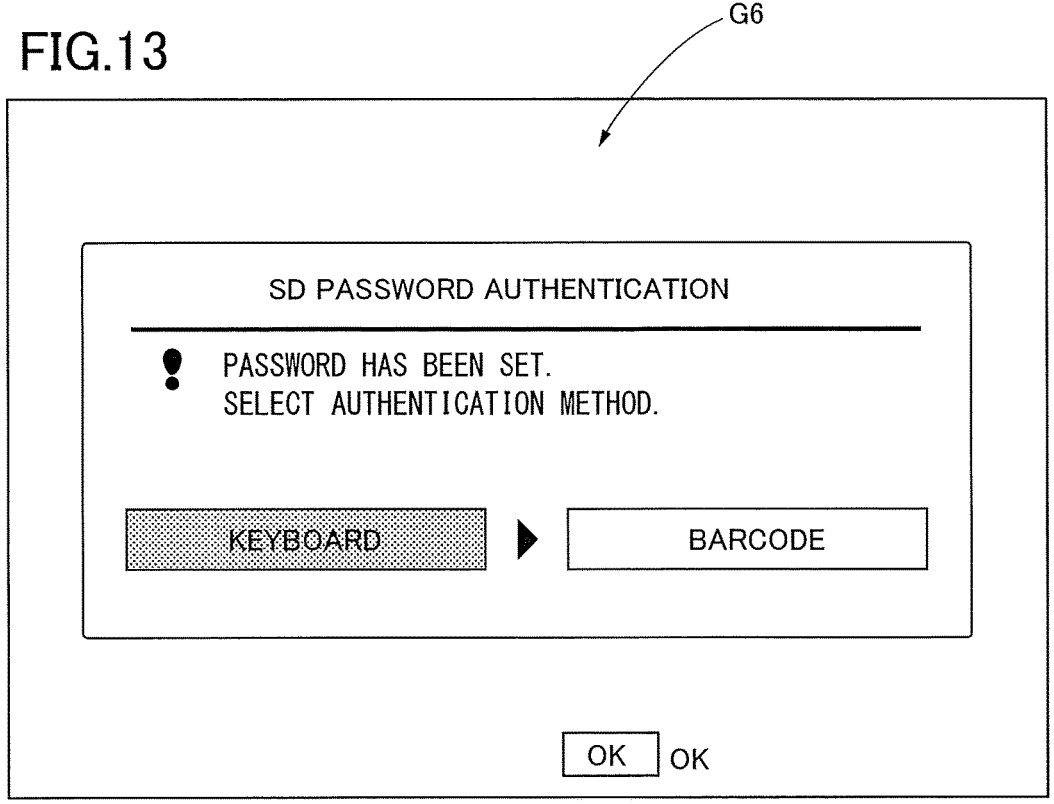
FIG. 13 an explanatory view showing a display screen which appears when the personal computer is connected, and which shows a method for inputting a password.
Figure 13A:
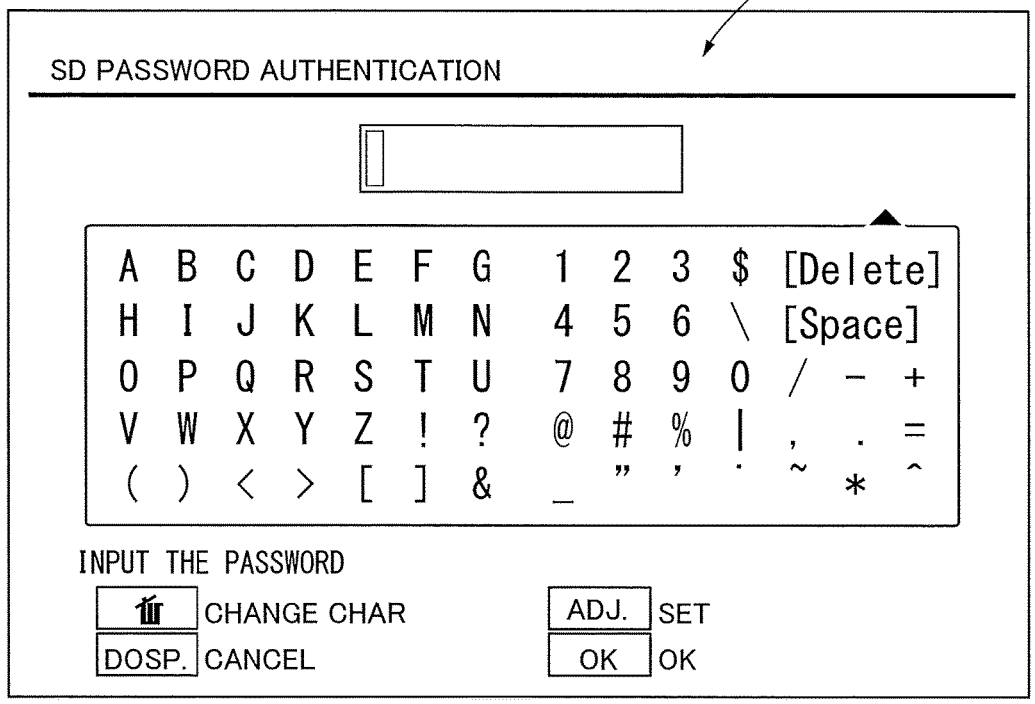
FIG. 13A is an explanatory view showing a screen displayed when an item of "KEYBOARD" is selected in the screen of FIG. 13.
Figure 20:
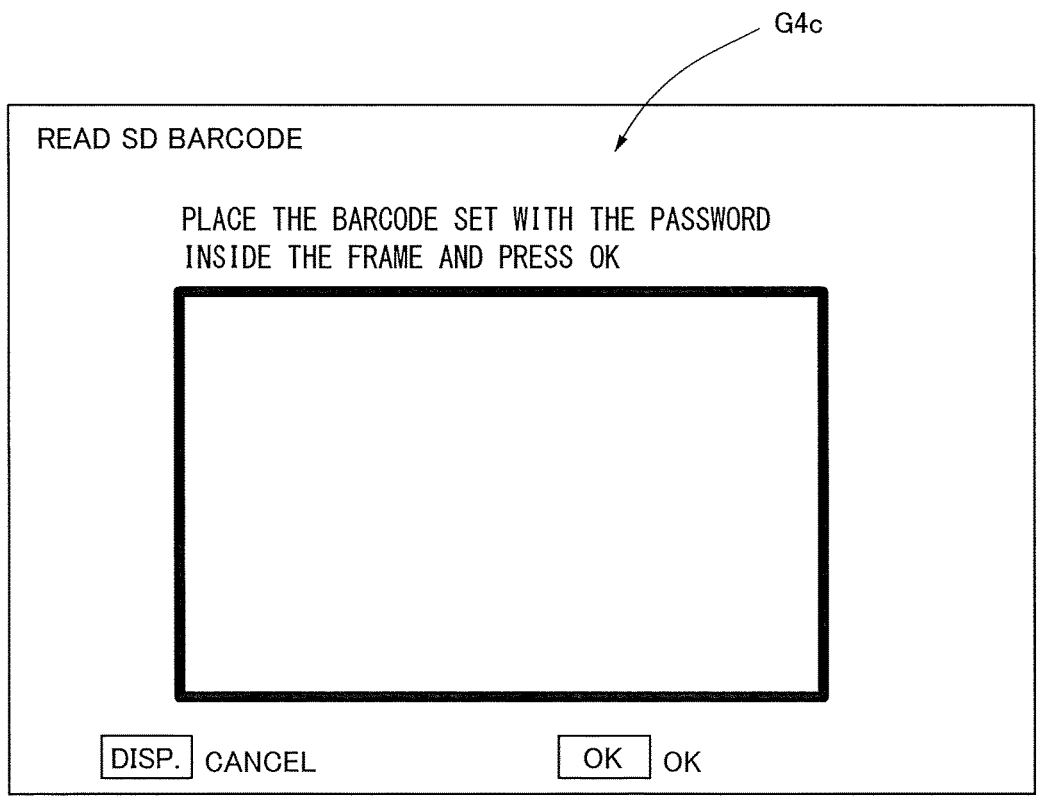
FIG. 20 is an explanatory view showing a guide screen to read a barcode.

In Step 11, an image G6 shown in FIG. 13 is displayed on the screen of the display device 23. When the item "KEYBOARD" is selected and confirmed, an image G6a shown in FIG. 13A is displayed on the screen of the display device 23. The operator then touches the image G6a in accordance with the guidance on the image G6a to input and confirm the password. When the item "BARCODE" is selected, the image G4c shown in FIG. 20 is displayed, and the operator operates the display device 23 in accordance with the guidance on the image G4c.

In Step 12, it is determined whether or not the password has been input. When the determination result is negative, the processing in Step 12 is repeated. When the password is input, the determination result becomes affirmative and the program proceeds to Step 13.

In Step 13, a command sequence for password authentication is executed through the SD card driver software. Accordingly, the password is sent to the SD card 21, and the CPU 13 requests the SD card 21 to release the security lock.

Figure 11C:
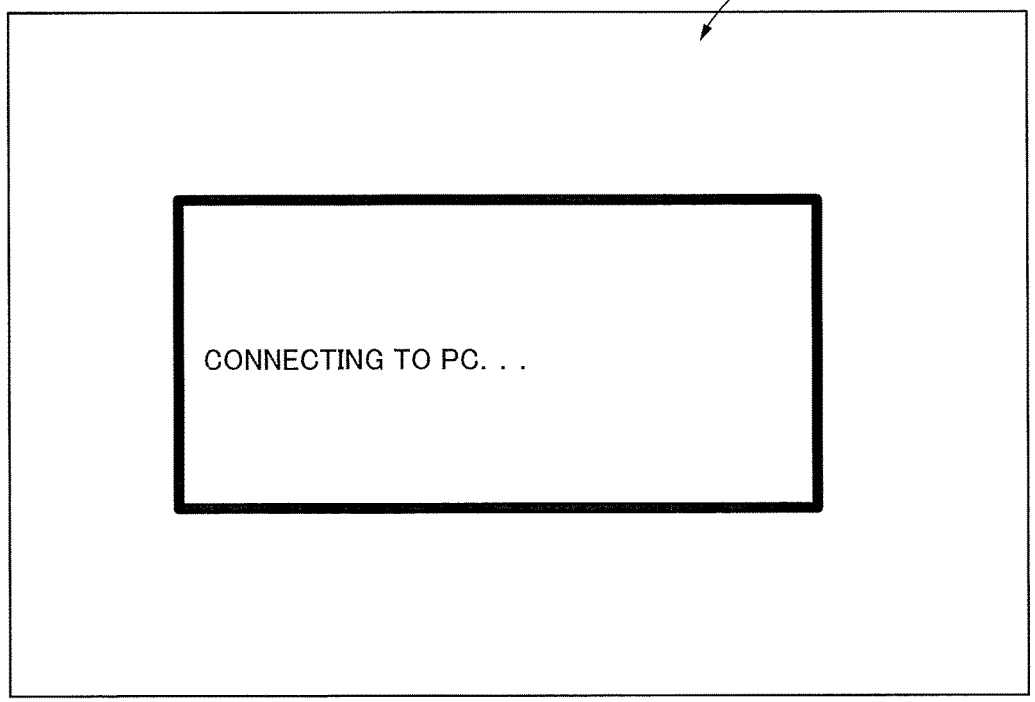
FIG. 11C is an explanatory view showing a display screen showing the personal computer is being connected thereto.

In Step 14, it is determined whether or not the input password coincides with the password set for the SD card 21. That is, the SD card 21 itself determines whether the password authentication is successful. When the input password coincides with the password set for the SD card 21, the determination result becomes affirmative and the program proceeds to Step 15. Further, when the password authentication is successful, the display device 23 displays a message "CONNECTING TO PC . . . ", as shown on the image G4a of FIG. 11C.

In Step 15, the SD card 21 release the security lock, and a USD driver of the communication I/F part 25 is initialized to prepare for the communication.

In Step 16, after completing the initialization of the USB driver, the terminal D+ is connected with a pull-up resistor such that the communication I/F part 25 informs the personal computer 2 (i.e., the host) of the preparation completion. In other words, the communication I/F part 25 informs the personal computer 2 that the SD card 21 has become accessible, and the process is then terminated.

With the notification of the preparation completion, the personal computer 2 can recognize that the SD card 21 is now controllable from the personal computer 2. That is, it is possible, with the personal computer 2, to confirm that the security lock of the digital camera 1 has been released. As a result, this improves the operability. Besides, as the security lock of the SD card 21 has been released, the personal computer 2 can operate the SD card 21 of the digital camera 1 as a mass-storage device.

Figure 13B:
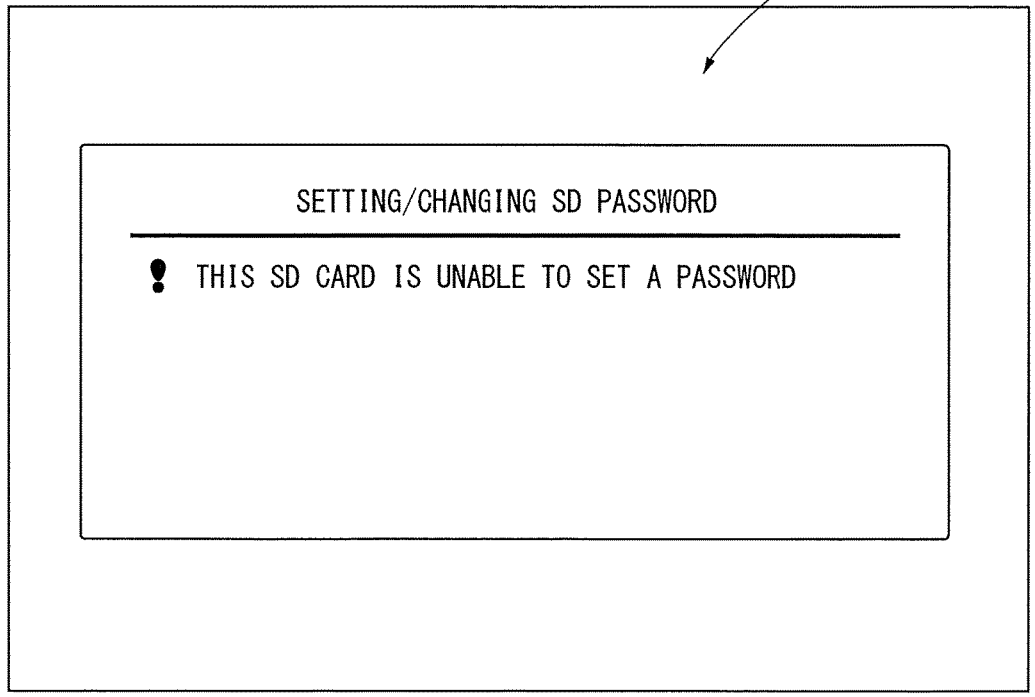
FIG. 13B is an explanatory view showing a screen displayed when the input password and the password for the SD card does not coincide with each other.

When the determination result in Step 14 is negative (i.e., when the input password does not coincide with the password of the SD card 21), the display device 23 displays a message, for example, "FORGOT PASSWORD?" on the screen of the digital camera 1, as shown on an image G6b of FIG. 13B. The process then proceeds to Step 17. In Step 17, the digital camera 1 is powered OFF, and the process is terminated. By powering OFF, the operator can recognize that the password authentication has been failed. Further, when the password authentication is failed, the personal computer 2 is unable to play the image file recorded in the SD card 21 or to write data into the SD card 21. Thus, the security lock of the SD card 21 is maintained.

Another Example

Figure 5A:
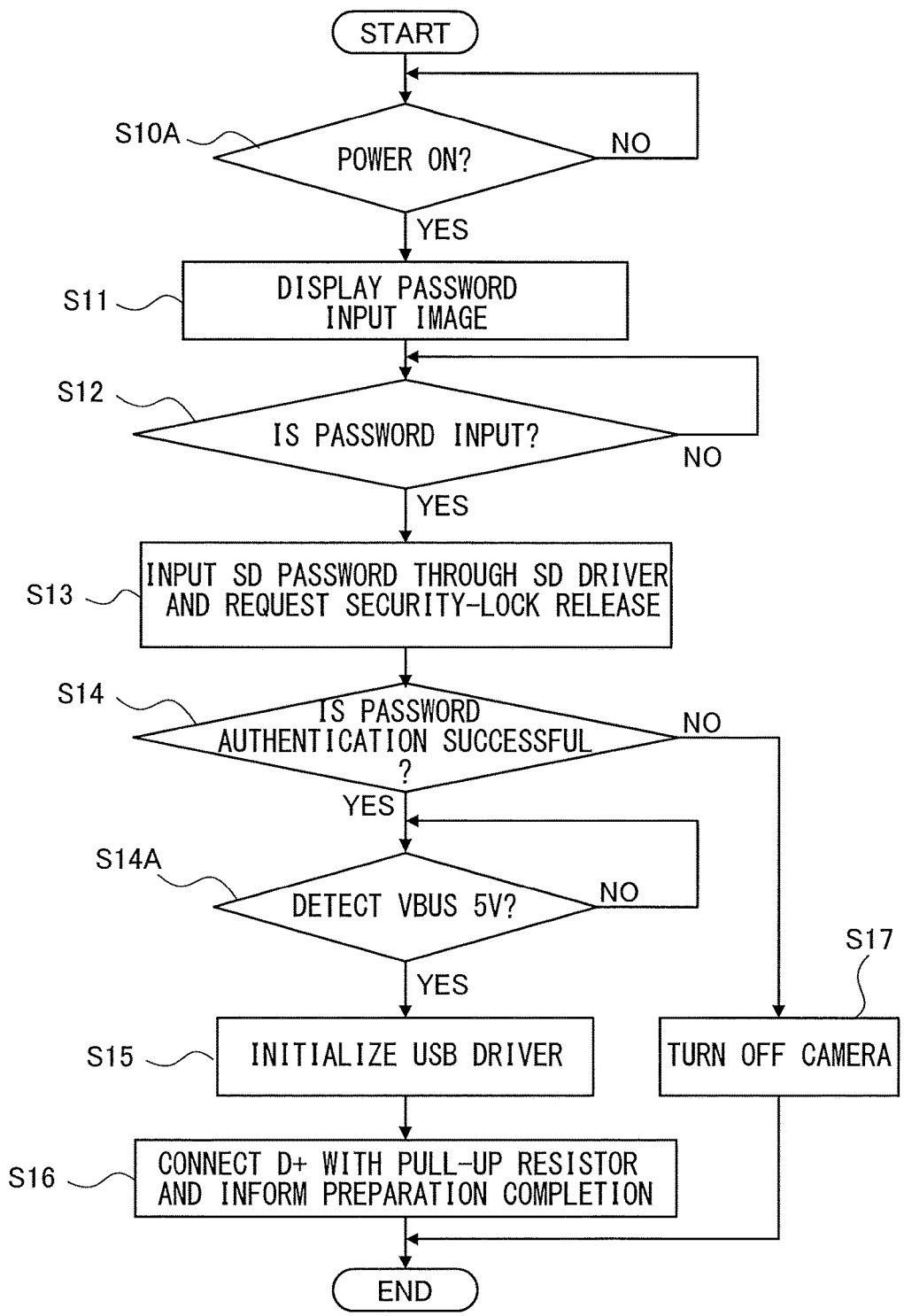
FIG. 5A is a flowchart showing another example of First Embodiment.

FIG. 5A shows a flowchart of another example. In this example, the digital camera 1 accepts the input of the password when the power of the digital camera 1 is turned ON, and the flowchart includes Step 10A, instead of Step 10, and Step 14A.

In Step 10A, it is determined whether or not the power is turned ON. When the power is turned ON, the program proceeds to Step 11.

In Step 14A, it is determined whether or not the communication I/F part 25 of the digital camera 1 detects the voltage of 5V supplied from the personal computer 2 through the VBUS. When the result is negative, the processing in Step 14A is repeated. When the personal computer 2 is connected to the digital camera 1 through the USB cable CD, the communication I/F part 25 detects the voltage of 5V supplied through the VBUS. The determination result thereby becomes affirmative, and the program proceeds to Step 15. As the other components of this example are identical to that of First Embodiment, the detailed explanation is omitted.

Second Embodiment

Figure 6:
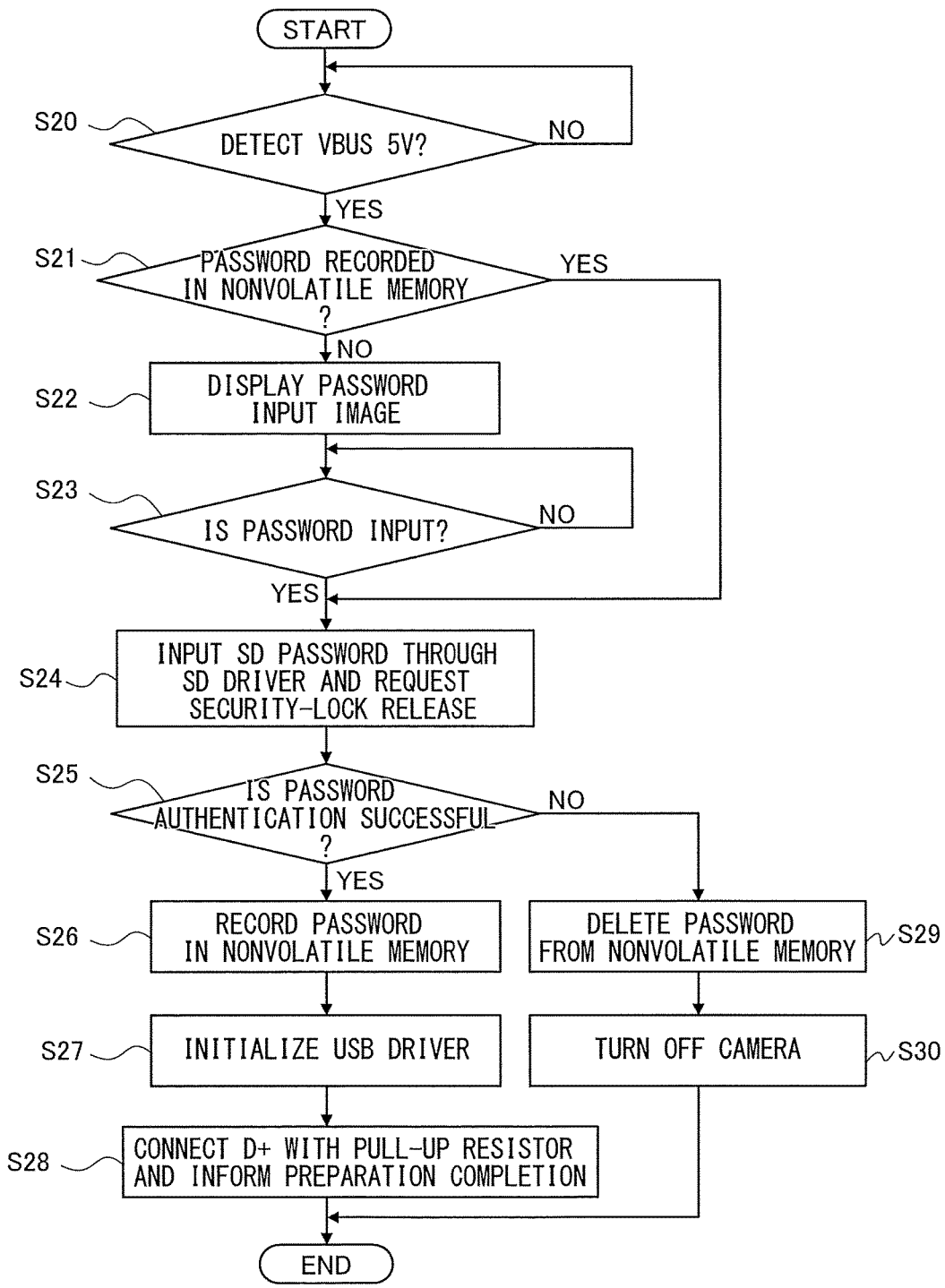
FIG. 6 is a flowchart showing process of Second Embodiment.

FIG. 6 is a flowchart showing the process executed by an external device in accordance with Second Embodiment. Here, the process executed in accordance with Second Embodiment will be described in accordance with this flowchart. The following process shown in FIG. 6 is also commenced when the digital camera 1 is powered ON.

In Step 20, it is determined whether or not the communication I/F part 25 of the digital camera 1 detects the voltage of 5V supplied from the personal computer 2 through the VBUS. When the result is negative, the processing in Step 20 is repeated. When the communication I/F part 25 detects the voltage of 5V supplied through the VBUS, the determination result becomes affirmative and the program proceeds to Step 21.

In Step 21, it is determined whether or not the password is recorded in a nonvolatile memory (i.e., a storage part; an internal memory) 16 illustrated in FIG. 1. That is, it is determined whether or not the password is recorded in the internal memory 16. This determination is performed by the CPU 13.

When the password is recorded in the internal memory 16, the program proceeds to Step 24.

In Step 24, the command sequence for password setting is executed through the SD card driver software such that the password is sent to the SD card 21 and a request for releasing the security lock is sent to the security-lock releasing part.

In Step 25, it is determined whether or not the password recorded in the internal memory 16 coincides with the password for the SD card 21. That is, when the digital camera 1 is powered ON, the password recorded in the internal memory 16 is read out and sent to the SD card 21. The SD card 21 determines whether or not the input password coincides with the password for the SD card 21. In other words, the SD card 21 determines whether the password authentication is successful. When the password recorded in the internal memory 16 coincides with the password for the SD card 21, the SD card 21 determines the password authentication is successful, resulting in the determination result being affirmative. The program then proceeds to Step 26.

When the internal memory 16 has a plurality of passwords therein, the SD card 21 determines whether the most-recently recorded password coincides with the password for the SD card 21.

As the password has already been recorded in the internal memory 16, the Step 26 is skipped and the program proceeds to Step 27. In Step 27, the security lock is released and the USB driver of the communication I/F part 25 is initialized to prepare for the communication.

In Step 28, as the initialization is completed, the communication I/F part 25 connects the terminal D+ with a pull-up resistor such that the personal computer 2 (i.e., the host) is informed of the preparation completion. The program is then terminated.

By receiving a notification of the preparation completion from the communication I/F part 25, the personal computer 2 is able to recognize the release of the security lock for the digital camera 1. As a result, the operability of the digital camera 1 improves. Further, as the security lock for the SD card 21 is releasable, the personal computer 2 is able to use the SD card 21 of the digital camera 1 as a mass-storage device.

When the determination in Step 21 is negative, i.e., when the internal memory 16 does not have a password recorded therein, the program proceeds to Step 22.

Similar to First Embodiment, the image G6 shown in FIG. 13 is displayed on the screen of the display device 23 in Step 22. When the item "KEYBOARD" is selected and determined, the image G6a shown in FIG. 13A appears on the display device 23. The operator then inputs the password by touching the image G6a in accordance with the guidance on the image G6a.

In Step 23, it is determined whether or not a password has been input. When the result is negative, the processing in Step 23 is repeated. When the password is input, the result becomes affirmative and the program proceeds to Step 24.

In Step 24, the command sequence for setting the password is executed through the SD card driver software. Accordingly, the password is sent to the SD card 21, and the request for releasing the security lock is sent to the security-lock releasing part.

In Step 25, it is determined whether or not the input password coincides with the password recorded for the SD card 21. That is, it is determined whether the password authentication is performed successfully. When the input password coincides with the password for the SD card 21, the determination result becomes affirmative, and the program proceeds to Step 26.

In Step 26, the password input in Step 22 or in Step 23 is recorded in the internal memory 16. The program then proceeds to Step 27 and 28 to execute the processing thereof, and the program is terminated.

When the determination result in Step 25 is negative, i.e., when the password recorded in the internal memory 16 does not coincide with the password for the SD card 21, the program proceeds to Step 29. Also, when the password input in Steps 22 and 23 does not coincides with the password for the SD card 21, the program proceeds to Step 29.

In Step 29, a password recording area of the internal memory 16 is initialized to delete the password recorded therein such that the internal memory 16 is set to have no recorded password. In Step 30, the digital camera 1 is powered OFF, and the operator is thereby informed that the password authentication was failed.

In the case of the internal memory 16 does not have any recorded password, the password is input in Step 22 and 23 and the program proceeds straight to Step 30. The digital camera 1 is then powered OFF, and the program is terminated.

In Second Embodiment, in the case of the password is recorded in the internal memory 16, the program proceeds from Step 21 to Step 24. Therefore, the security lock is released without inputting the password in Step 24. As a result, it improves the operability of the digital camera 1.

Third Embodiment

Figure 7:
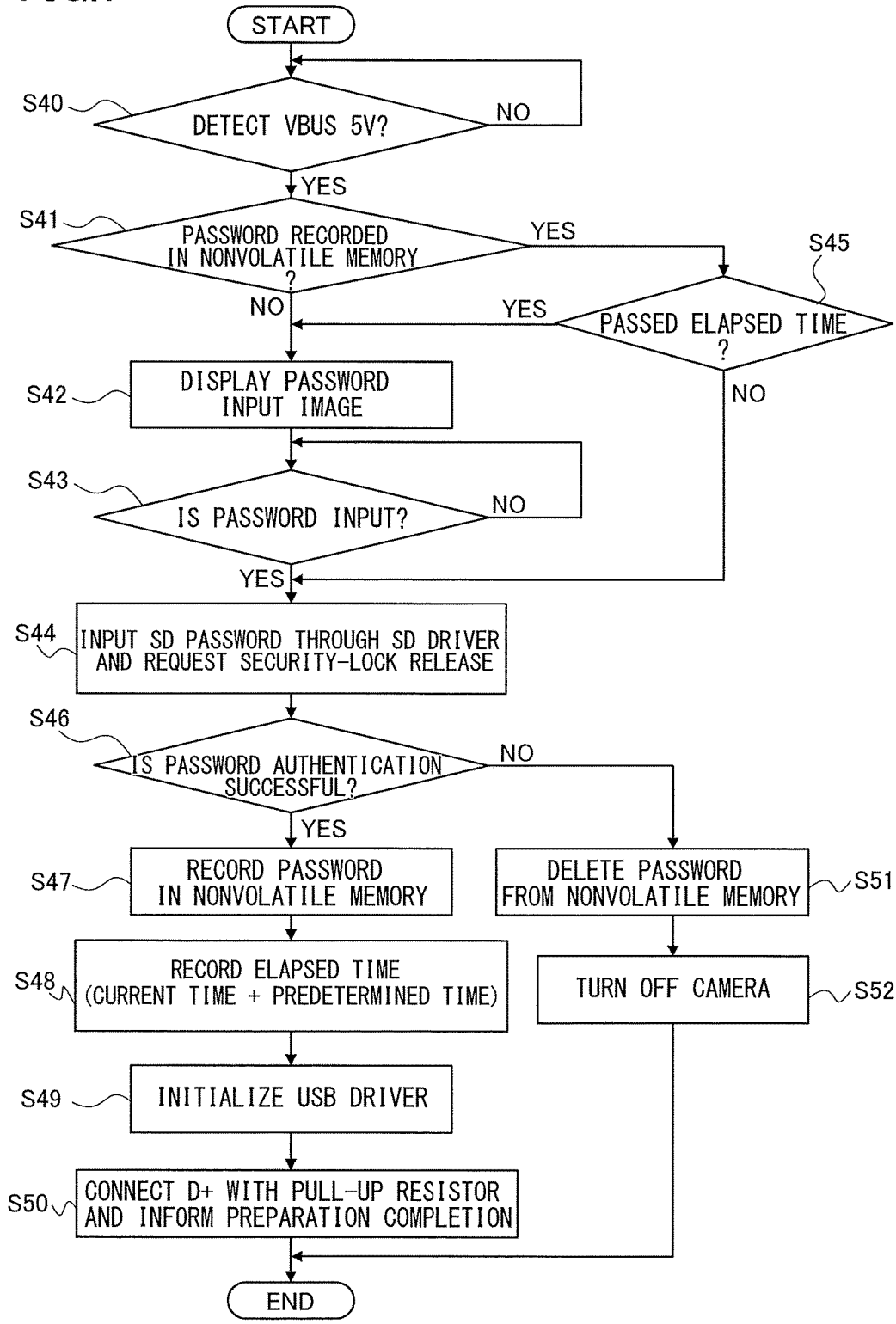
FIG. 7 is a flowchart showing process of Third Embodiment.

FIG. 7 is a flowchart showing process regarding a connection of an external device in according to Third Embodiment. In the flowchart of Third Embodiment, Steps 45 and 48 are added to the flowchart of Second Embodiment. The processing of Steps 45 and 48 will be described below.

Figure 14:
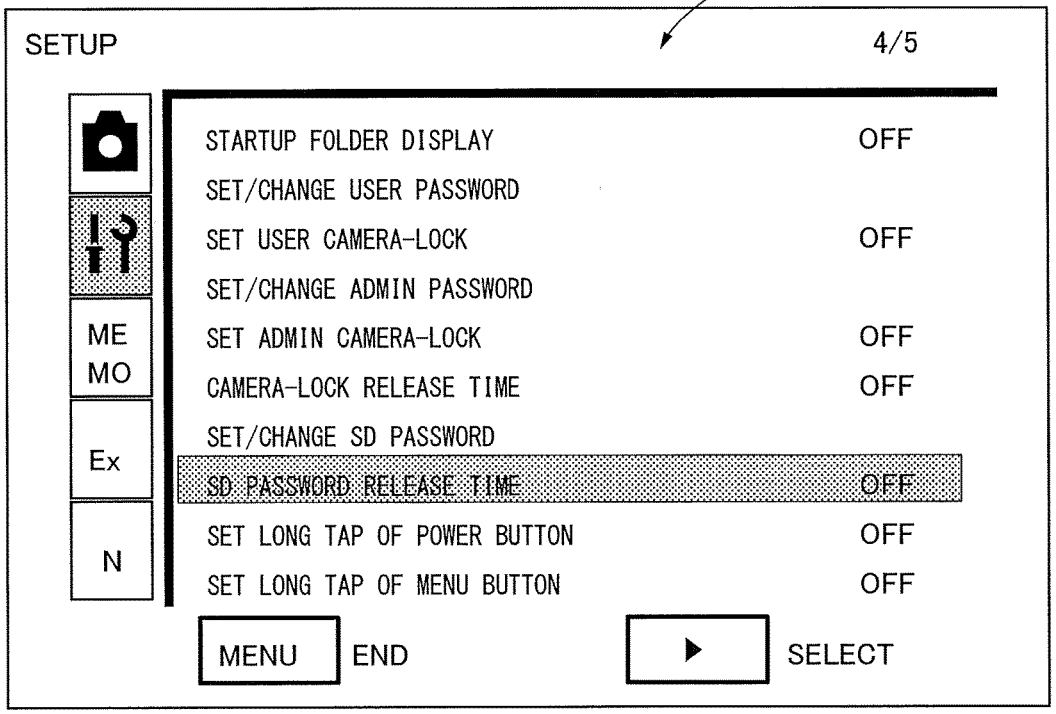
FIG. 14 is an explanatory view showing an image displayed when an item of SD PASSWORD RELEASE TIME is selected in the setting menu.
Figure 15:
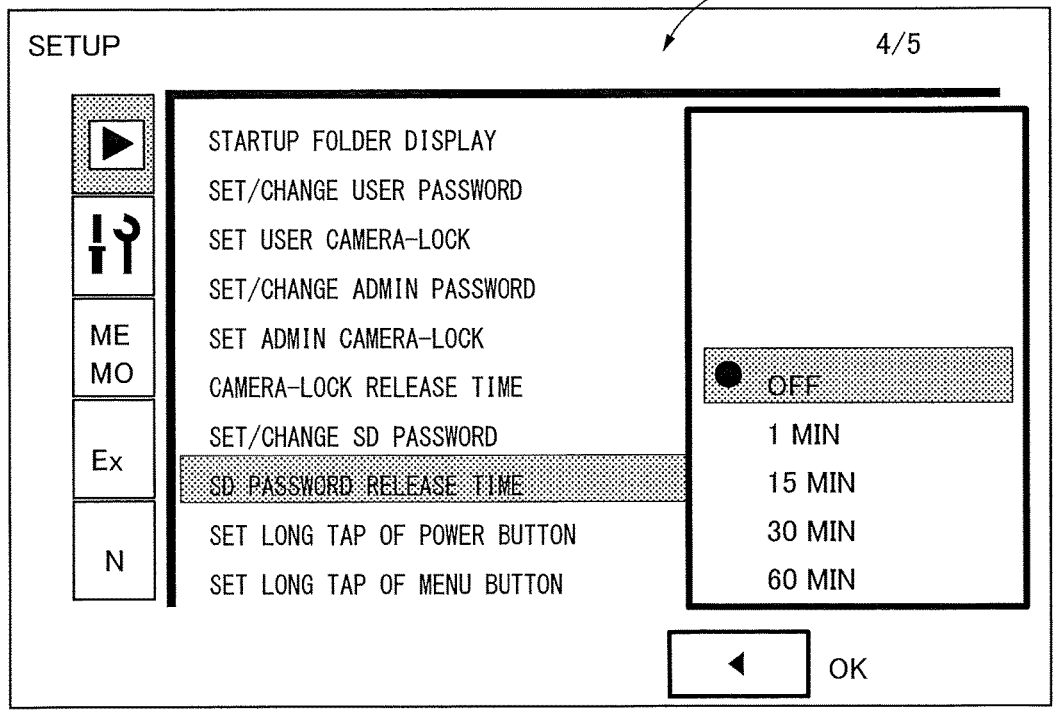
FIG. 15 is an explanatory view showing elapsed times to be selected in the image of FIG. 14.
Figure 16:
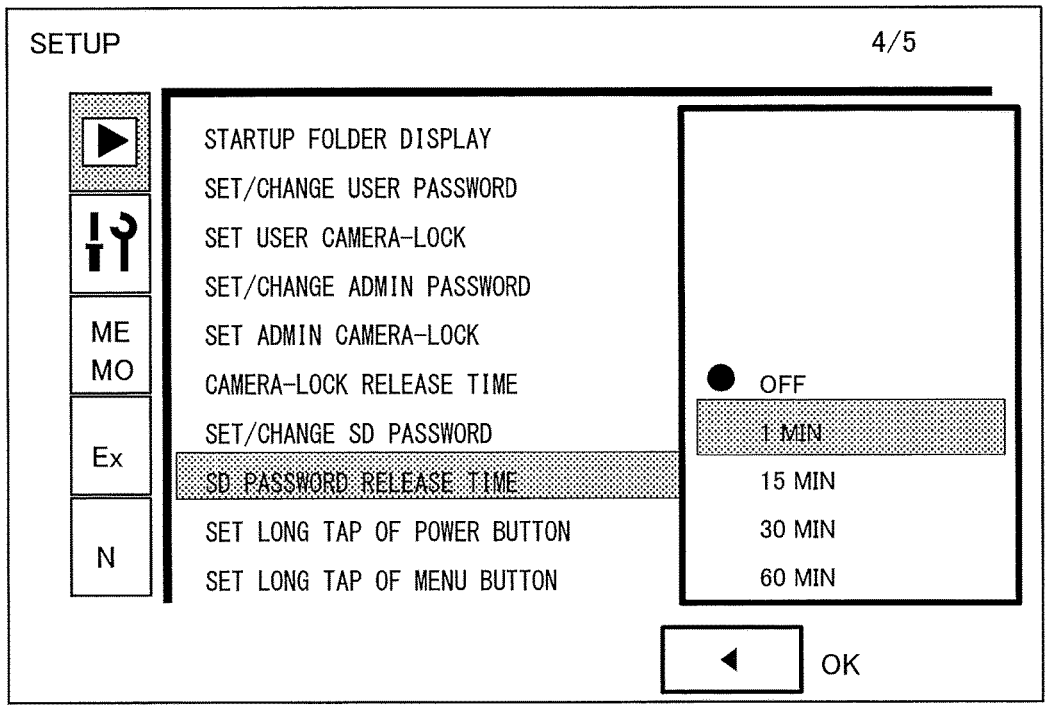
FIG. 16 is an explanatory view showing a screen displayed when one (1) minute is selected as the elapsed time.
Figure 17:
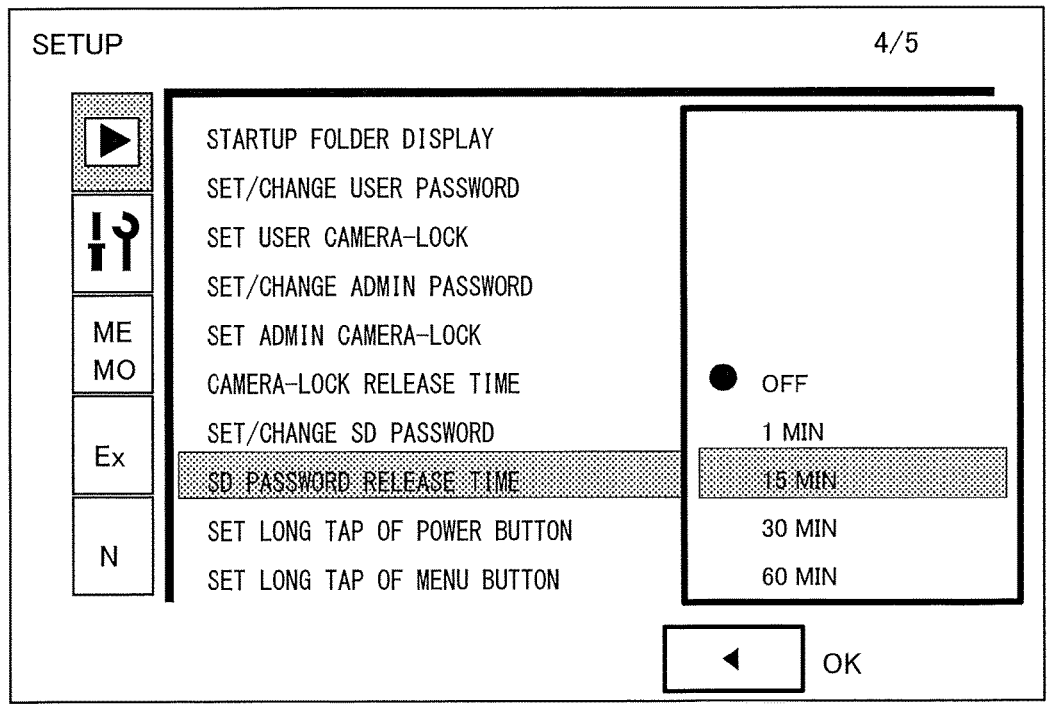
FIG. 17 is an explanatory view showing a screen displayed when fifteen (15) minute is selected as the elapsed time.
Figure 18:
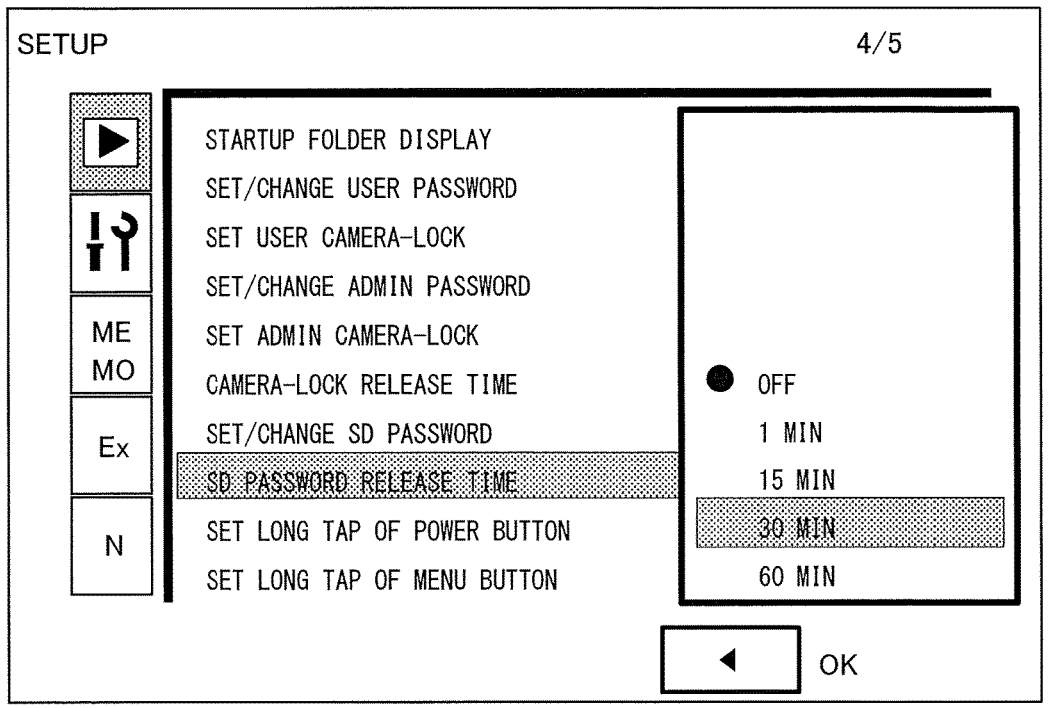
FIG. 18 is an explanatory view showing a screen displayed when thirty (30) minutes is selected as the elapsed time.
Figure 19:
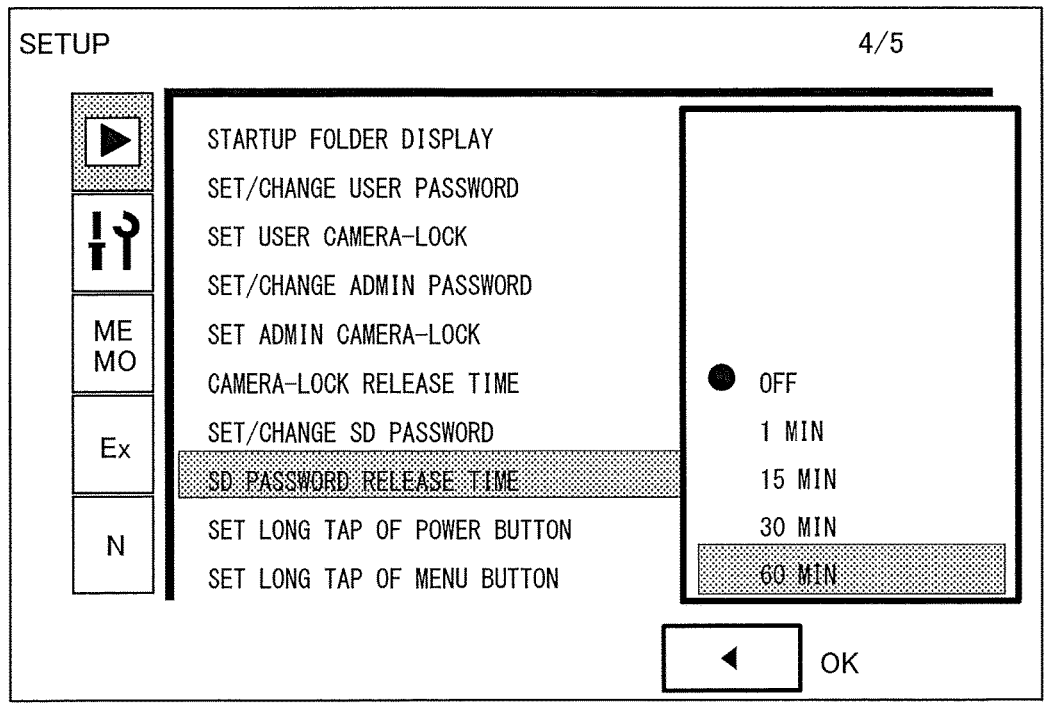
FIG. 19 is an explanatory view showing a screen displayed when sixty (60) minutes is selected as the elapsed time.

With the image G1 for the setting menu shown in FIG. 8, when the item "SD PASSWORD RELEASE TIME" in an image G7 shown in FIG. 14 is selected, an image G8 appears as shown in FIG. 15. On the image G8, the times "1MIN.", "15MIN.", "30MIN.", and "60MIN." are shown. The operator can select and determine a desired time as a predetermined time (a data-retention time) from them, as shown in FIG. 16 to FIG. 19. Accordingly, the data retention time of the password recorded in the internal memory 16 is selectable.

In step 48 of FIG. 7 flowchart, a time (an elapsed time) which is calculated by adding the selected predetermined time to the current time (i.e., the current time+the predetermined time) is recorded in the internal memory 16. For example, if the current time is 4:00 p.m. and the predetermined time is 20 minutes, the elapsed time to be recorded in the internal memory 16 is 4:20 p.m. Step 48 is repeated until the digital camera 1 is powered OFF as the current time changes. That is, "the time when the power is turned OFF"+"the predetermined time" will be recorded in the internal memory 16 as the elapsed time.

To be specific, if the power is turned OFF at 5:00 p.m., the elapsed time to be recorded is 5:20 p.m. (i.e., 5:00 p.m.+20 minutes).

Further, if the power is turned ON at 5:10 p.m., the program executes the processing of Step 45 to determine whether the elapsed time (i.e., at 5:20 p.m. in this case) is passed. As the determination result is negative, the program proceeds to Step 44.

That is, so long as the current time has not reached the elapsed time, the operator does not need to input the password.

In other words, the clock starts when the digital camera 1 is turned OFF. If the digital camera 1 is again turned ON within the set time (i.e., within the predetermined time), the CPU 13 deems that the password has already been input and activates the digital camera 1. As a result, the operator does not need to input the password so long as the powered ON time is within the predetermined time, and therefore the operability of the digital camera 1 improves.

With Third Embodiment, it is possible to achieve the similar effects to that of Second Embodiment. Here, the processing of other than Steps 45 and 48 are the same as those of FIG. 6. The detailed description thereof is thus omitted.

In Second and Third Embodiments, the password is recorded in the internal memory 16, and additionally, a serial number of the SD card 21 may also be recorded therein. If a serial number and a corresponding password are recorded for each SD card, the operator can release the security lock without inputting the password when one of the SD cards is inserted to the digital camera 1.

In such a case, the CPU 13 reads out the serial number that coincides with the inserted SD card 21 and reads out the password corresponding to the serial number from the internal memory 16. That is, the CPU 13 has a function of acquiring part to acquire the serial numbers for the corresponding SD cards 21 from the internal memory 16 and a function of readout part to read out the password corresponding to the acquired serial numbers.

The CPU 13 releases the security lock of the SD card 21 by the security-lock releasing part when the readout password coincides with the password for the SD card 21.

Alternatively, the security-lock releasing part may be configured such that, even when the personal computer 2 is not connected to the digital camera 1, the image G6a shown in FIG. 13 is displayed upon powering ON the digital camera 1 and the operator can input a password in accordance with the guidance of the image G6a to release the security lock thereof.

This invention should not be limited to the above embodiments. It should be appreciated that variations and additions may be made without departing from the scope of the present invention.

What is claimed is:

1. An electronic device configured to be used with a recording medium, the recording medium having a security-lock function in which a security lock is activated by setting a recording medium password, the electronic device comprising:
    a communication interface configured to connect with an external device; and
    processing circuitry configured to
        determine whether or not the communication interface detects that the electronic device and the external device are connected via a cable,
        in response to determining that the electronic device is connected to the external device via the cable, display a password input screen and receive an input password,
        send, to the recording medium, the input password, and
        when the recording medium determines that the input password matches the set recording medium password, receive, from the recording medium, an indication to release the security lock and inform the external device that the recording medium is accessible.

2. The electronic device according to claim 1, wherein the recording medium is configured to set the security lock using the set recording medium password, and release the security lock using the recording medium password,
    the electronic device includes an imaging sensor configured to photograph a subject,
    the communication interface is further configured to detect the connection of the external device to a device body of the electronic device and communicate with the external device,
    the recording medium is configured to release the security lock of the recording medium when the input password matches the set recording medium password, and
    when the communication interface detects the connection of the external device to the device body and the security lock has been released, the communication interface informs the external device that the recording medium is accessible from the external device.

3. The electronic device according to claim 1, wherein the processing circuitry is further configured to receive the input password when the electronic device is powered ON.

4. The electronic device according to claim 1, wherein the processing circuitry is further configured to record the input password in a memory when the electronic device is powered ON.

5. The electronic device according to claim 4, wherein the processing circuitry is further configured to set a data-retention time of the recorded input password.

6. The electronic device according to claim 1, wherein the processing circuitry is further configured to receive the input password by a barcode.

7. The electronic device according to claim 4,
    wherein the processing circuitry is further configured to record, in the memory, a serial number and a corresponding password for each recording medium of a plurality of recording media.

8. The electronic device according to claim 7, wherein the processing circuitry is further configured to acquire, from the memory, a particular serial number of a particular recording medium, and read out the stored password corresponding to the particular serial number, and
    wherein the particular recording medium inputs the read-out password.

9. The electronic device according to claim 1, wherein the processing circuitry is configured to receive the input password after the external device is connected to the electronic device.

10. The electronic device according to claim 1, wherein the electronic device is a digital camera.

11. A connection method of connecting an external device to an electronic device, the electronic device configured to be used with a recording medium and having a communication interface to connect with the external device, the recording medium having a security lock function in which a security lock is activated by setting a recording medium password, the method comprising:
    determining whether or not the communication interface detects that the electronic device and the external device are connected via a cable;
    in response to determining that the electronic device is connected to the external device via the cable, displaying a password input screen and receiving an input password;
    sending, to the recording medium, the input password;
    when the recording medium determines that the input password matches the set recording medium password, releasing the security lock of the recording medium password, and informing the external device that the recording medium is accessible.

* * * * *